3,426,010
THIAZOLE-PYRAZOLONE AZO YELLOW DYES
William Paul Dunworth, Wilmington, Del., assignor to
E. I. du Pont de Nemours and Company, Wilmington,
Del., a corporation of Delaware
No Drawing. Filed Dec. 1, 1965, Ser. No. 510,963
U.S. Cl. 260—158  5 Claims
Int. Cl. C07f 3/14

ABSTRACT OF THE DISCLOSURE

Alkali metal salts of mono- and disulfonic acid derivatives of 3-alkyl-4-[(4-{6-methyl-2-benzothiazolyl}phenyl)azo]-5-pyrazolones, useful for coloring paper pulp.

SUMMARY OF THE INVENTION

The present invention is directed to novel azo dyes that are partly or almost completely substantive to cellulosic fibers and, accordingly, are particularly useful for coloring paper pulp with or without the use of the rosin size and alum to afford colored paper.

It is an object of the present invention to provide novel yellow dyes for paper which possess the useful combination of properties known in the trade as bleachability and substantivity.

It is important in the paper industry to be able to provide dyed pulp and paper which are easily bleached, e.g. with chlorine or chlorine containing compounds, because any trimmings or so-called broke can be bleached and reused immediately in other grades of paper, including white.

It is a further object of this invention to provide novel yellow dyes for paper which, in addition to the above described properties, possess good brightness and lightfastness, and satisfactory solubility in hard water in the cold. A still further object is to provide such dyes which exhibit outstanding tinctorial strength on paper, and thus offer good value in the trade.

DETAILED DESCRIPTION OF THE INVENTION

These and other objects of the invention will be apparent from the following description and claims.

It has been discovered that the heretofore stated objects can be accomplished by utilizing a monosulfo or disulfo monoazo of the formula:

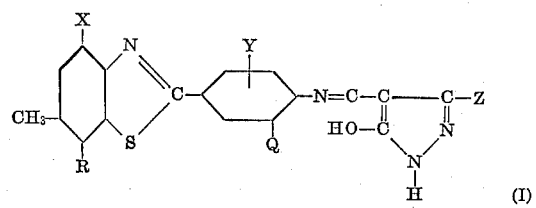

wherein X is H or $CH_3$; Y is H or $CH_3$; R is H or $SO_3M$; Q is H or $SO_3M$; Z is lower alkyl (1 to 4 C-atoms); and M is an alkali metal.

Preferred dyes coming within this invention are:
(a) The azo dye of the formula:

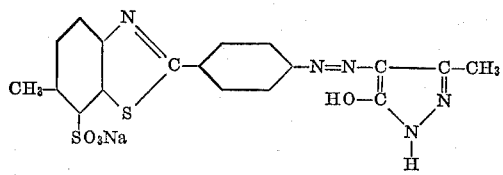

(b) The azo dye of the formula:

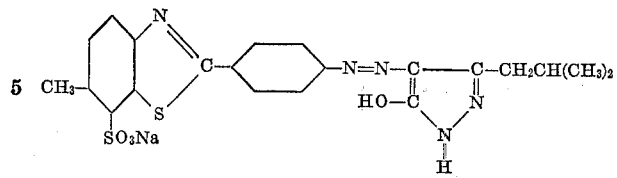

(c) The azo dye of the formula:

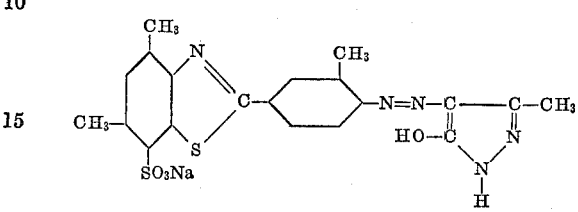

(d) The azo dye of the formula:

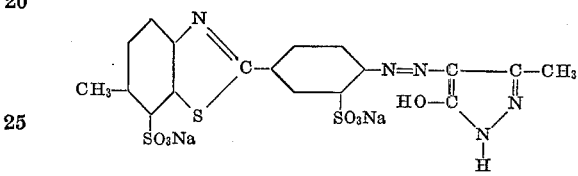

The novel compounds of this invention are prepared by diazotizing an amine of the formula:

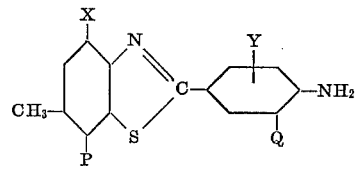

wherein X, Y, P and Q are defined as heretofore, and coupling the diazo to a pyrazolone of the formula:

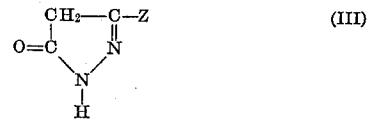

wherein Z is lower alkyl.

Another embodiment of the present invention consists in the use of the dyes of Formula I in the beater dyeing of paper pulp, optionally in the presence of alum and/or rosin size, followed by formation of the dyed paper sheet.

A further embodiment of the invention is paper pulp dyed with a dye of Formula I.

Representative examples further illustrating the invention follow.

Example 1.—Preparation of dyes (a) 38.4 parts of 2-(p-aminophenyl)-6-methyl-7-benzothiazolesulfonic acid are dissolved in 420 parts of water by stirring in the presence of sufficient sodium hydroxide (about five parts) to provide a pH of ten. After dissolving 8.4 parts of sodium nitrite in the alkaline solution the whole is cooled to 10° C. The resulting solution is then added in a stream to a well stirred solution at 10° C. containing 60 parts of water and 53 parts of 30% hydrochloric acid. Ice is added to the acid solution during the addition, if necessary, to maintain the temperature below 20° C. After the addition, the resulting diazo slurry is stirred for one hour maintaining the temperature under 20° C. During the stirring period, checks are made to insure the presence of a slight excess of nitrous acid. At the end of the stirring period the excess nitrite is removed with about 0.2 part of sulfamic acid.

A solution consisting of 240 parts of water, 12.9 parts of 3-methyl-5-pyrazolone and about five parts of sodium hydroxide, which has been cooled to about 10° C., is then added to the cold, stirred diazo slurry. The pH of the resulting slurry is then adjusted to 7.0 to 8.0 and maintained in this range by the slow addition of about 7.5 parts of sodium hydroxide while maintaining the temperature below 20° C. After one hour stirring under these conditions, the reaction mixture is heated to about 80° C. and the dye is isolated by adding sodium chloride (about two parts) to the reaction mixture and stirring until an essentially colorless bleed is obtained upon spotting a test sample of the slurry on filter paper. The slurry is filtered and the filter cake is dried. Approximately 50 parts of pure dye, mixed with a little sodium chloride, are obtained. It has the formula:

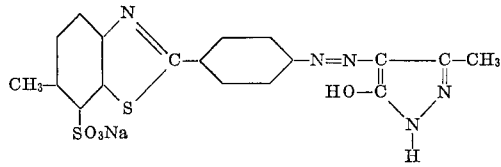

The product is a reddish yellow powder which does not melt below 260° C. Its aqueous solution exhibits an absorption maximum at about 425 millimicrons, and dyes paper an attractive yellow shade using the methods described in Example 5. (b) When the 12.9 parts of 3-methyl-5-pyrazolone used in part (a) of the present example are replaced by 18.5 parts of 3-isobutyl-5-pyrazolone, a yellow paper dye having similar properties is obtained. It has the formula:

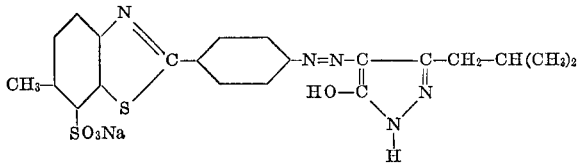

The 3-isobutyl-5-pyrazolone is obtained by reacting hydrazine with ethyl isovalerylacetate. The ethyl isovalerylacetate is prepared by the procedure described by Robert Levine and Charles R. Hauser in J. Am. Chem. Soc. 66, 1768 (1944).

Example 2

(a) The procedure of Example 1(a) is followed except that the 38.4 parts of 2-(p-aminophenyl)-6-methyl-7-benzothiazolesulfonic acid are replaced by 44.5 parts of the substituted phenylbenzothiazole obtained in the sulfur fusion of 2,4-xylidine at 180° to 220° C., followed by sulfonation. A yellow paper dye having similar properties, and having the following formula is obtained,

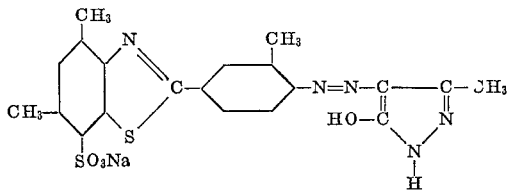

(b) Similar paper dyes are also obtained when the coupling component used in parts (a) of Examples 1 and 2 is replaced by a chemical equivalent amount of 3-ethyl-5-pyrazolone, 3-propyl-5-pyrazolone, 3-butyl-5-pyrazolone, or with mixtures of any of the 3-(lower alkyl)-5-pyrazolone. These lower alkyl-5-pyrazolones are obtained by conventional procedures as illustrated in Example 1(b).

Example 3

The procedure of Example 1(a) is followed except that the 38.4 parts of 2-(p-aminophenyl)-6-methyl-7-benzothiazolesulfonic acid are replaced by 41.5 parts of the product obtained by heating a mixture of about equal parts of p-toluidine and 2,4-xylidine with sulfur at 180° to 220° C. to form a mixture of monomethylated, dimethylated and trimethylated (p-aminophenyl)benzothiazoles, distilling off the mixed products, and then sulfonating said mixture in the usual manner.

Other xylidines such as 3,4-xylidine may also be used in the mixed arylamine-sulfur fusion step.

Example 4

(a) The procedure described in Example 1(a) is followed, except that the diazo component is replaced by 38.4 parts of the isomeric benzothiazolesulfonic acid in which the sulfo group is located ortho to the amino group. Said isomer is obtained by baking the sulfate of 2-(p-aminophenyl)-6-methylbenzothiazole. The final dye has the formula

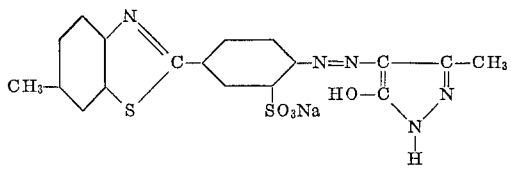

and dyes paper pulp in bright yellow shades by the methods of Example 5.

(b) The procedure described in Example 1(a) is followed, except that the diazo component is replaced by 48 parts of the 2-(p-aminophenyl)-6-methylbenzothiazole-disulfonic acid obtained by baking the sulfate of 2-(p-aminophenyl)-6-methylbenzothiazole followed by conventional sulfonation in oleum. A yellow paper dye of the following structure is obtained.

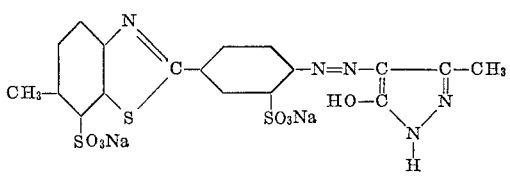

Likewise the baking process, or the baking process followed by oleum sulfonation, can be applied to the dimethyl and trimethyl-(p-aminophenyl)benzothiazoles disclosed heretofore.

It is to be understood that any of the diazo components disclosed herein can be coupled to any of the 3-(lower alkyl)-5-pyrazolones to provide useful yellow dyes for paper pulp and paper.

Although M in the previous examples is sodium, the M can be varied using conventional procedures. Thus, the replacement of sodium hydroxide were used in Example 1(a) with lithium or potassium hydroxide, and the use of lithium or potassium chloride in the salting step, will yield the lithium or potassium salt, respectively. Alternatively, a chemically equivalent amount of a mixture of lithium, sodium, and potassium hydroxides, in any combinations, will yield dyes in which M is composed of a mixture of these metals.

Example 5.—Application of dyes (a) One thousand parts of bleached sulfite pulp are dispersed in 18,000 parts of water. One part of the dye prepared in Example 1(a), 15 parts of rosin size and 25 parts of Paper Makers Alum (commercial aluminum sulfate, $Al_2(SO_4)_3 \cdot 18H_2O$) are added and the mixture is agitated for about 0.5 hour. Paper sheet is then formed by conventional procedures to yield paper which is dyed an attractive bright yellow shade.

The amount of dye employed in the present dyeing procedure may be varied from about 0.05 to 25.0 parts to give lightly tinted to deeply colored dyeings. The percent by weight of bleached sulfite pulp in the initial slurry may vary from 0.25 to about 6. Likewise, the amount of rosin size and alum used in the process may vary from about 5 to 25 parts, and from about 10 to 35 parts, respectively, or these additives may be omitted. The use of rosin size is omitted when paper stock for use in colored tissue and the like is being dyed with the novel azo paper dyes.

(b) When the process described in part (a) of the present example is repeated, except that rosin size is omitted, a yellow paper is obtained which is colored to the same depth as that obtained when the resin size is used.

Example 6.—Bleaching process

Five parts of colored paper, prepared as described in Example 5(a), and 95 parts of water are agitated at 140° F. (60° C). Calcium (or sodium) hypochlorite is added to provide one percent available chlorine, based on the air-dry weight of the colored paper. The slurry is agitated at 135° to 140° F. (57° to 60° C.) for 45 minutes. After adding 0.025 part of sodium acid sulfate, the slurry is agitated for five minutes and then diluted with cold water to provide a 0.5 percent concentration of paper fiber in the slurry. Paper sheet is then made up according to the manner well known in the art of paper making to provide paper which is free of color.

When deeply colored paper is bleached, the amount of available chlorine used is the present example is increased to about three percent.

If desired, the dyes of this invention may be used for the coloration of paper in the presence of wet strength agents or in the presence of dye retention aids other than size and alum, which agents and aids are well known in the art of paper making. Although dyeings may be performed at pH values of about 7, it is preferred to use additives in the dye liquor which provide a pH of about six or below. Ordinary rosin size contains both free rosin and sodium rosinate, and its solution has a pH of about 11 to 12. A solution of Paper Makers Alum has a pH of about 3. Thus, by mixing these two additives, one readily adjusts the pH of the dye liquor to the desired value of about pH 6, or lower for sized papers.

The beater dyeing method for the coloration of paper is well known in the art of paper making. A specific application is shown in Example 5. The better, used in paper manufacture, is defined in the Van Nostrand Chemists Dictionary, 1953, page 69, as ". . . a tank in which the pulpwater mixture is agitated and cut by means of rotating blades, until the fibers have been separated and reduced in length to the degree desired before they pass to the four-drinier ( the actual sheet-forming apparatus)." An extensive discussion of the beater dyeing method is found in the book, Pulp and Paper Manufacture, Volume 2, Preparation of Stock for Paper Making, McGraw-Hill, 1951, pages 492 to 509.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property is claimed are as follows:

1. A yellow monoazo dye of the formula:

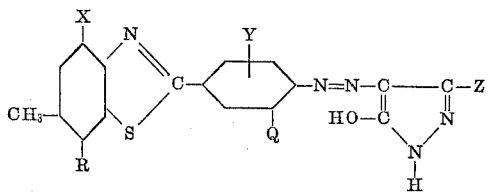

wherein X is selected from the group consisting of H and $CH_3$; Y is selected from the group consisting of H and $CH_3$; P is selected from the group consisting of H and $SO_3M$; Q is selected from the group consisting of H and $SO_3M$; Z is a lower alkyl radical of from 1 to 4 carbon atoms and M is an alkali metal, with the proviso that at least one of R and Q is $SO_3M$.

2. A yellow monoazo dye according to claim 1, said dye having the formula

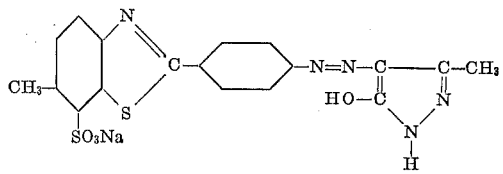

3. A yellow monoazo dye according to claim 1, said dye having the formula

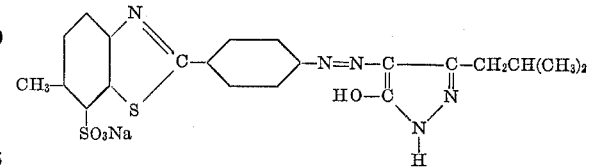

4. A yellow monoazo dye according to claim 1, said dye having the formula

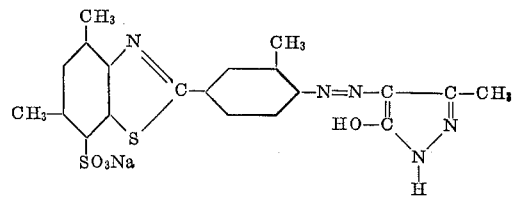

5. A yellow monoazo dye according to claim 1, said dye having the formula

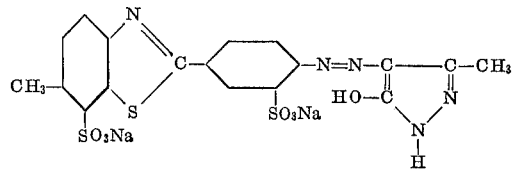

References Cited

UNITED STATES PATENTS 3,101,988  8/1963  Bossard et al. _____ 260—158 X

CHARLES B. PARKER, *Primary Examiner.*

DONALD M. PAPUGA, *Assistant Examiner.*

U.S. Cl. X.R.

8—7; 117—154; 260—304

Disclaimer 3,426,010.—*William Paul Dunworth*, Wilmington, Del. THIAZOLE-PYRAZ-
OLONE AZO YELLOW DYES. Patent dated Feb. 4, 1969. Disclaimer filed Feb. 18, 1970, by the assignee, *E. I. du Pont de Nemours and Company*.
Hereby enters this disclaimer to claims 1 and 2 of said patent.
[*Official Gazette June 2, 1970.*]